United States Patent
Muchow et al.

(10) Patent No.: US 9,979,269 B2
(45) Date of Patent: May 22, 2018

(54) MICROMECHANICAL COMPONENT AND METHOD FOR PRODUCING A MICROMECHANICAL COMPONENT

(71) Applicant: Robert Bosch GmbH, Stuttgart (DE)

(72) Inventors: Joerg Muchow, Reutlingen (DE); Helmut Grutzeck, Kusterdingen (DE); Frederic Njikam Njimonzie, Reutlingen (DE); Zoltan Lestyan, Martonvasar (HU); Sebastian Reiss, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 359 days.

(21) Appl. No.: 14/762,290

(22) PCT Filed: Apr. 24, 2013

(86) PCT No.: PCT/EP2013/058437
§ 371 (c)(1),
(2) Date: Jul. 21, 2015

(87) PCT Pub. No.: WO2014/173437
PCT Pub. Date: Oct. 30, 2014

(65) Prior Publication Data
US 2015/0357897 A1   Dec. 10, 2015

(51) Int. Cl.
*G02B 26/08* (2006.01)
*H02K 41/035* (2006.01)
(Continued)

(52) U.S. Cl.
CPC ....... *H02K 41/0356* (2013.01); *G02B 26/085* (2013.01); *H02K 15/0068* (2013.01); *H01F 2007/068* (2013.01); *Y10T 29/49011* (2015.01)

(58) Field of Classification Search
CPC .. G02B 26/085; H02K 15/0068; H02K 41/00; H02K 41/0356; H02K 41/0358; Y10T 29/49011; H01F 2007/068
(Continued)

(56) References Cited

U.S. PATENT DOCUMENTS 6,061,164 A * 5/2000 Ikegame ............... F16F 1/025
                                                        359/199.1
2004/0008400 A1   1/2004 Hill et al.

FOREIGN PATENT DOCUMENTS

DE   102008001238   10/2009
DE   102008001896   11/2009
(Continued)

OTHER PUBLICATIONS

International Search Report for PCT/EP2013/058437, dated Nov. 26, 2013.

*Primary Examiner* — James Phan
(74) *Attorney, Agent, or Firm* — Norton Rose Fulbright US LLP; Gerard Messina

(57) ABSTRACT

A micromechanical component includes a mount; a drive body on which at least one coil device is disposed and which is connected to the mount by way of at least one spring such that the drive body can be set into a driving motion by an interaction of a current conducted through the at least one coil device and a magnetic field present at the at least one coil device; and a control element connected to the drive body such a manner that a setting of the drive body into a driving motion causes the control element to be set into a deflection motion with at least one motion component directed about a rotation axis. At least one connecting element disposes the drive body and control element relative to each other such that the rotation axis extends at a spacing from a center of gravity of the drive body.

15 Claims, 4 Drawing Sheets

(51) Int. Cl.
*H02K 15/00* (2006.01)
*H01F 7/06* (2006.01)

(58) Field of Classification Search
USPC .................... 359/199.3, 200.7, 223.1–226.2
See application file for complete search history.

(56) References Cited

FOREIGN PATENT DOCUMENTS

| DE | 102011103190 | | 9/2012 |
|---|---|---|---|
| WO | 2009/127274 | * | 10/2009 |

* cited by examiner

MICROMECHANICAL COMPONENT AND METHOD FOR PRODUCING A MICROMECHANICAL COMPONENT

FIELD OF THE INVENTION

The present invention relates to a micromechanical component and to a method for producing a micromechanical component.

BACKGROUND

German Patent Application document DE 10 2008 001 896 A1 describes a micromechanical component and a method for producing a micromechanical component. An embodiment of the micromechanical component includes a central frame on which an inner coil system is situated. The central frame frames a flexible plate, which is connected to the central frame via two torsion springs. In addition, the central frame is attached via two further torsion springs to an inner frame, which frames the central frame. The central frame is said to be excitable by the interaction of a current conducted through the inner coil system and a magnetic field in such a manner that the flexible plate may be set into a rotational motion about a rotation axis centrally intersecting the central frame.

SUMMARY

The present invention makes possible an oscillatory system in which a drive body and a control element form two masses that can be set into different motions by energizing at least one coil device in an outer magnetic field, which offers the advantage that the control element oscillatory system and the drive body oscillatory system can be optimized separately. In particular, an inertia of the control element oscillatory system is less than a customary inertia of a complete oscillatory system formed by a drive body and a control element that is attached to the drive body in a non-displaceable manner. As will be described in greater detail hereinafter, that advantageous lower inertia of the control element oscillatory system can be used to optimize its natural frequencies. This is able to result in lower mechanical stress, whereby it is possible to prevent undesirable deformation of the control element and/or of the drive body during the deflection motion of the control element.

In particular, the present invention ensures an advantageous positioning/orientation of the drive body with respect to the control element. Since the center of gravity of the drive body lies outside of the rotation axis about which the control element can be set into a rotational motion, the Lorentz force that can be produced by energizing the at least one coil device acts at a greater distance from the rotation axis and therefore causes a higher torque. The effect of the Lorentz force produced can thus be advantageously intensified.

Preferably, the drive body and the control element are disposed relative to each other by way of at least one connecting element in such a manner that the drive body is oriented asymmetrically with respect to the rotation axis. This may also be described as an eccentric distribution of the mass of the drive body with respect to the rotation axis. In that manner, an effect of the Lorentz force caused by energizing the at least one coil device can be intensified.

The control element may be a mirror and/or a filter. It is therefore advantageously possible for the micromechanical component to be used for a large number of optical applications.

Preferably, the rotation axis extends centrally through the control element, which ensures an advantageously low inertia of the control element oscillatory system, whereby a natural frequency of 10-50 kHz can be obtained.

In a preferred embodiment, the at least one spring is a flexible spring that is deformable in an S-shape. As will be mentioned in greater detail below, with such a configuration of the at least one drive spring an advantageously high natural frequency of the control element oscillatory system is ensured.

In an advantageous development, the at least one spring includes at least one drive spring without a line and at least one supply line spring carrying a supply line. By attaching the drive body to the mount using the at least one drive spring without a line and the at least one supply line spring carrying a supply line, it is possible for the different springs to be optimized independently of one another with regard to the purpose of their use.

Preferably, a supply line spring constant of the at least one supply line spring is smaller than a drive spring constant of the at least one drive spring, which is advantageous because the drive spring is a construction without a line, and hence a high mechanical stress occurring in the at least one drive spring is not able to result in any line damage. At the same time, with the aid of a comparatively great drive spring constant an overall spring constant of the spring system for attaching the drive body to the mount can be increased. With the aid of the increased overall spring constant the natural frequency of the drive body oscillatory system can also be established in a range of 10-50 kHz.

For example, the supply line spring constant can be smaller than one third of the drive spring constant. Thus, the mechanical stress occurring in the at least one supply line spring during a movement of the drive body in relation to the mount is comparatively small and is hardly capable of contributing to damage to the line component guided over the at least one supply line spring, and it is therefore possible to facilitate an advantageously long functionality of the at least one line component.

In addition, the at least one supply line spring can be patterned out of a first layer of a first layer thickness, and the at least one drive spring can be patterned out of a second layer of a second layer thickness greater than the first layer thickness, ensuring an advantageous ratio between the supply line spring constant and the drive spring constant, which is significantly increased in comparison therewith.

In one advantageous embodiment, the at least one supply line spring is of a meander-shaped and/or spiral configuration. The meander-shaped and/or spiral configuration of the at least one supply line spring enables its length to be increased, which causes a reduction in a supply line spring constant of the at least one supply line spring. Since the mechanical stress occurring in the at least one supply line spring during a movement of the drive body is proportional to the supply line spring constant, it is possible, with the reduced supply line spring constant, to counteract damage to the at least one line component during a movement of the drive body in relation to the mount.

As an alternative or in addition, the at least one supply line spring can be formed exclusively from at least one conductive material that self-supportingly spans at least one gap disposed between the drive body and the mount. This may also be described as the at least one supply line spring being constructed as the at least one line component. By the exclusive use of the at least one conductive material to form the at least one supply line spring, an advantageously low supply line spring constant is ensured for it.

For example, the at least one line component can be formed from copper, aluminum, silver and/or gold. Owing to the low supply line spring constant that can be achieved, it is possible for the materials mentioned here, which bring about good conductivity, to be used without fear of damage to the line component as a result of mechanical stress during a movement of the drive body in relation to the mount.

In addition, in an example embodiment, the at least one connecting element includes a web element that is oriented perpendicularly to a coil carrier surface of the drive body. The control element can be formed on the coil carrier surface in a projecting manner. As will be explained in greater detail hereinafter, a gap between the control element and the coil carrier surface can thus be used for the placement of various components.

In an advantageous example embodiment, the drive body and the control element are disposed inside an encapsulation, with a magnet being fastened outside of the encapsulation to a side wall that is adjacent to the coil carrier surface of the drive body. In that manner, an advantageously high magnetic field strength can be ensured in the region of the at least one coil device.

The advantages mentioned above are also afforded in a corresponding method for producing a micromechanical component.

Further features and advantages of the present invention are described below with reference to the figures.

DETAILED DESCRIPTION

Figure 1:
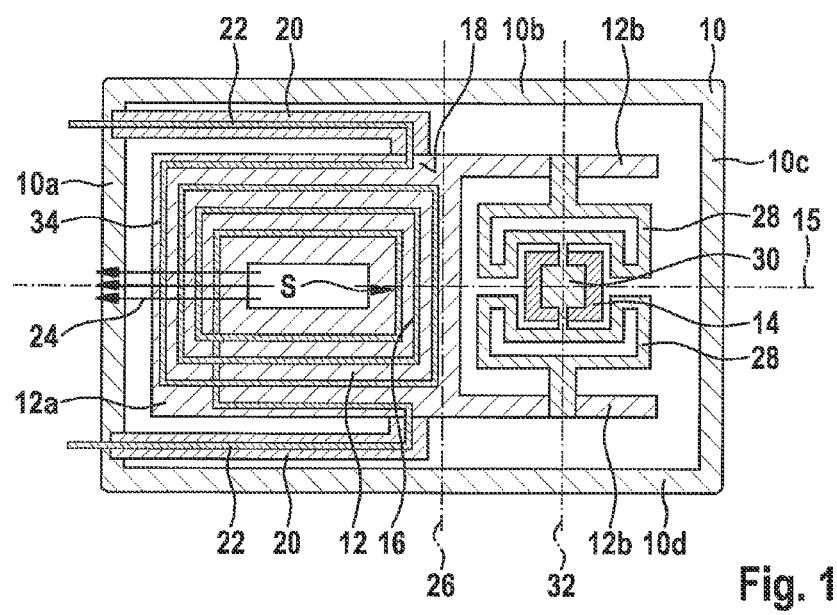
FIG. 1 shows a schematic representation of a micromechanical component, according to a first example embodiment of the present invention.

FIG. 1 shows a schematic representation of a first example embodiment of a micromechanical component, which includes a mount 10, a drive body 12, and a control element 14, which is, for example, a mirror and/or a filter. Mount 10 can, for example, be configured as an outer frame made up of four web elements 10a-10d, which frames at least drive body 12 and control element 14. However, the configurability of the micromechanical component is not bound to a particular shape of mount 10.

At least one coil device 16 is disposed on and/or in drive body 12. The at least one coil device 16 can, for example, be formed on a coil carrier surface 18 of drive body 12. Drive body 12 is connected to mount 10 by way of at least one spring 20. Preferably, drive body 12 is connected to mount 10 by way of at least two springs 20 formed symmetrically with respect to an axis of symmetry 15. The at least one spring 20 can be in the form of a flexible spring that is deformable in an S-shape. As will be described in greater detail hereinafter, however, the configuration of the at least one spring 20 is not limited to the example given herein.

At least one line component 22 is guided over the at least one spring 20 in such a manner that a current can be conducted through the at least one coil device 16 via the at least one line component 22. In addition, owing to an interaction of the current conducted through the at least one coil device 16 and a magnetic field with magnetic field lines 24, which is present at the at least one coil device 16, drive body 12 can be set into a driving motion. For example, owing to the magnetic interaction, drive body 12 can be set at least into a driving rotational motion directed about a driving axis 26. Preferably, driving axis 26 is oriented perpendicularly to axis of symmetry 15.

In an example embodiment, drive body 12 includes a coil carrier 12a (approximately frame-shaped) with a comparatively wide configuration to provide space for the formation of a high number of windings. In that manner, even when the micromechanical component is equipped with only one coil device 16 disposed on coil carrier 12a, a sufficiently great force can be produced for displacing control element 14 by energizing the sole coil device 16.

Control element 14 is connected by way of at least one connecting element 28 and 30 to drive body 12 in such a manner that, with the aid of drive body 12 when set into a driving motion, control element 14 can be set into a deflection motion with at least one motion component that is directed about a rotation axis 32. In particular, control element 14 can be set into a purely rotational motion which is directed about rotation axis 32. Preferably, rotation axis 32 runs centrally through control element 14. That ensures an advantageous low torque of control element 14 with respect to rotation axis 32.

Drive body 12 and control element 14 are disposed relative to each other by way of the at least one connecting element 28 and 30 in such a manner that rotation axis 32 extends at a spacing from a center of gravity S of drive body 12, meaning that center of gravity S of drive body 12 does not lie on rotation axis 32, for example, center of gravity S and rotation axis 32 lie in different planes parallel to light impingement surface 18 of drive body 12 and/or in different planes perpendicular to light impingement surface 18 of drive body 12.

Owing to center of gravity S disposed outside of rotation axis 32, the Lorentz force that is able to be produced by energizing the at least one coil device 16 causes a greater torque on control element 14. For example, an average spacing of the current paths of the at least one coil device 16, which current paths are oriented parallel to rotation axis 32, from rotation axis 32 is greater owing to the spaced position of center of gravity S of drive body 12. In addition, as will be explained in greater detail below, it is possible to produce in a simple manner a magnetic field with a comparatively high magnetic field strength at the edge regions of a volume occupied by drive body 12 and control element 14, which edge regions are spaced from rotation axis 32, whereas the magnetic field strength of the magnetic field in a central region lying centrally between the edge regions is comparatively low. It is therefore advantageous for a current path 34 that is spaced furthest away from rotation axis 32 to be disposed in one of the edge regions and for a spacing of current path 34 that is furthest away from rotation axis 32 to be additionally increased relative to rotation axis 32 by the spaced position of center of gravity S of drive body 12. In that manner, an advantageously high torque may be produced on control element 14, especially by energizing current path 34 that is spaced furthest away from rotation axis 32.

Drive body 12 and control element 14 can be disposed relative to each other by way of the at least one connecting element 28 and 30 in such a manner that drive body 12 is oriented/disposed asymmetrically with respect to rotation axis 32, causing an advantageous increase in the torque that can be produced on control element 14 by energizing the at least one coil device 16. The orientation of drive body 12 with respect to driving axis 26 can be asymmetrical.

Control element 14 can be connected to drive body 12 by way of at least one connecting element 28 configured as an oscillatory spring 28, bringing about an advantageous division, already described above, of the (complete) oscillatory system into a drive body oscillatory system and a control element oscillatory system. Preferably, control element 14 is connected to drive body 12 via two oscillatory springs 28 constructed symmetrically with respect to axis of symmetry 15. Each of the two oscillatory springs 28 can be anchored to a web portion 12*b* of drive body 12, which web portion 12*b* is oriented parallel to axis of symmetry 15. In addition, the at least one connecting element 28 and 30 can include a web element 30 that is oriented perpendicularly to coil carrier surface 18 of drive body 12. With the aid of web element 30, control element 14 can be placed in a position/attitude in which it projects out of coil carrier surface 18. This is advantageous especially in the case of a planar construction of the at least one control element 14, such as, for example, in the case of a mirror or a filter. Owing to the protruding arrangement of control element 14, a gap between control element 14 and a plane of light impingement surface 18 can be used for the placement of further components, such as, for example, the at least one oscillatory spring 28. In that manner, the installation space required for the micromechanical component can be significantly reduced. In addition, especially in the case of two oscillatory springs 28 being provided in the gap between control element 14 and the plane of coil carrier surface 18, it is possible to ensure that mechanical stress possibly occurring in the two oscillatory springs 28 is transmitted to a central region of control element 14. Thus, the mechanical stress is scarcely able to contribute to deformation of control element 14. Additionally, by central attachment of the at least one connecting element 28 and 30 to control element 14, a reduction in the moment of inertia of control element 14 can be obtained.

Owing to the advantageous decoupling of control element 14, it is possible to form a two-spring-mass system including a drive body oscillatory system, in which drive body 12 oscillates with deformation at least of the at least one spring 20 in relation to mount 10, and including a control element oscillatory system, in which control element 14 can be set into the desired rotational motion about rotation axis 32 in relation to drive body 12 and/or mount 10. This two-mass system is realizable in such a way that various materials, such as metals and silicon, can be integrated with one another in such a way that there is no occurrence of bimetal effects, which can, if present, lead to an undesirable deformation of control element 14. In addition, in the case of the micromechanical component described herein, materials with differing thermal expansion coefficients are not deposited in such a way that they are able to contribute to a static temperature-dependent deformation of control element 14. Owing to the advantageous attachment of control element 14 to drive body 12, control element 14 can be formed in a comparatively large size of, for example, 1.8 mm×2.3 mm, while at the same time ensuring good displaceability of control element 14 about rotation axis 32, for example by up to 9° at a frequency of 20 kHz. The micromechanical component capable of being produced here also has a comparatively low power consumption. In particular, it is ensured that, during displacement of control element 14 about rotation axis 32, deformations that can lead to a widening of the light impingement point on control element 14 configured as a mirror, thereby impairing the resolution of an image produced by the mirror, do not occur in it.

Figure 2A:
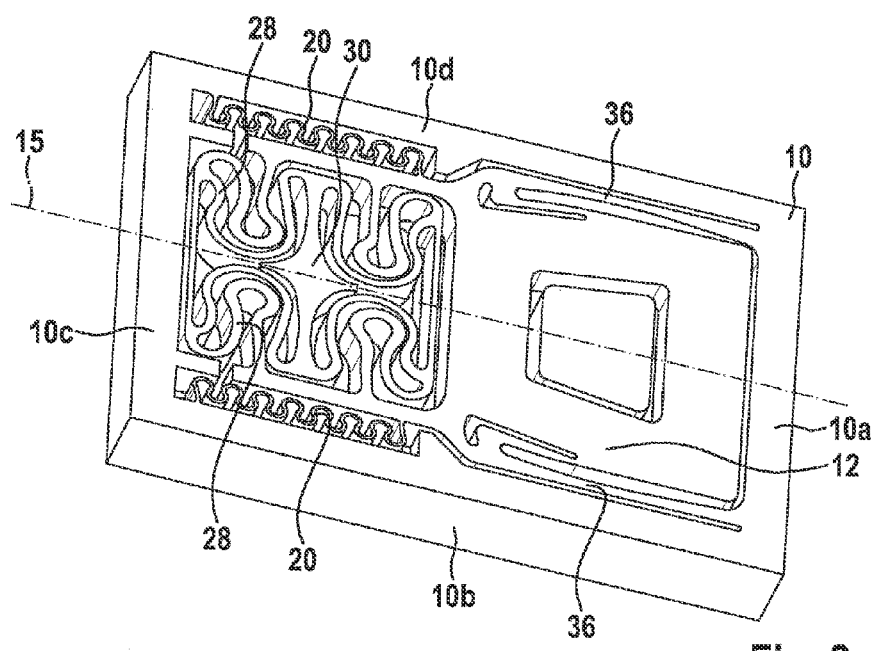
FIGS. 2a-2c show two plan views and a cross-section of a micromechanical component according to a second example embodiment of the present invention.
Figure 2B:
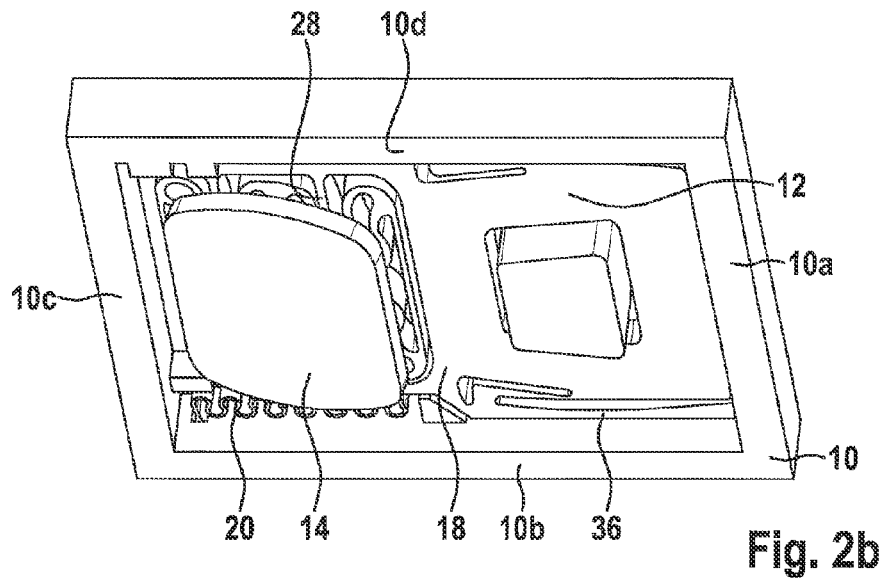
Figure 2C:
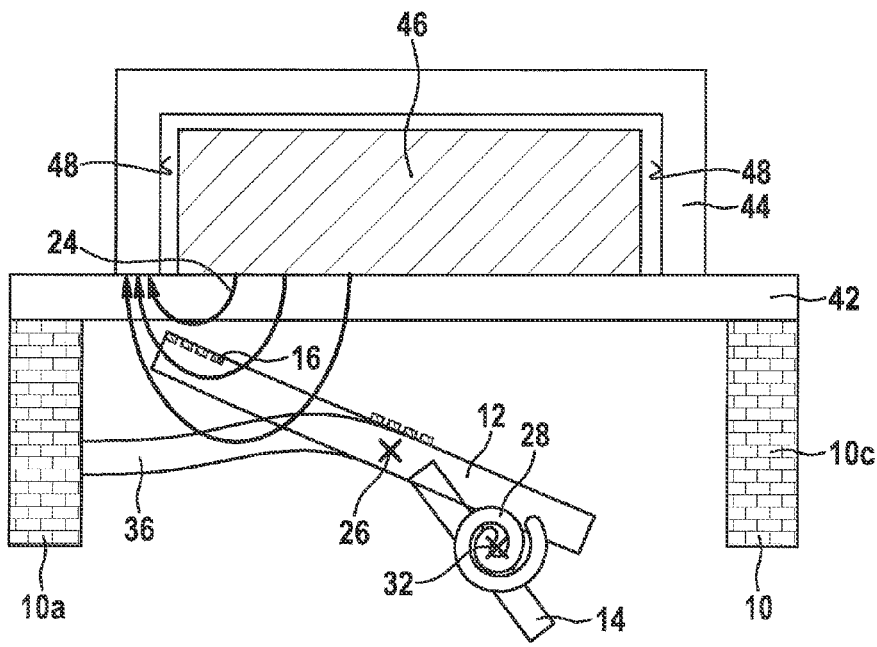

FIGS. 2*a*-2*c* show two plan views and a cross-section of a second example embodiment of the micromechanical component, which includes two supply line springs 20 by which drive body 12 is connected to mount 10 and over which at least one respective line component 22 is guided. In addition, the micromechanical component also includes at least one lineless drive spring 36 via which drive body 12 is connected to mount 10. For example, the at least one drive spring 36 is provided with a lineless construction in which no line/line component is provided on or in the at least one drive spring 36. The at least one lineless drive spring 36 is also not capable of being used as a line/line component. Preferably, the at least one drive spring 36 is formed completely of at least one material in such a way that a modulus of elasticity is equal to or greater than the modulus of elasticity of silicon.

Preferably, drive body 12 is connected by way of two lineless drive springs 36 to a web element 10*a* of mount 10, which web element 10*a* is adjacent to drive body 12 and remote from control element 14. Drive springs 36 are preferably provided symmetrically with respect to axis of symmetry 15. Each of the two drive springs 36 contacts drive body 12 on a side remote from axis of symmetry 15. The attachment of drive body 12 to mount 10 reproduced in FIGS. 2*a*-2*c*, using exactly two supply line springs 20 and two flexible springs 36, is to be interpreted, however, as being merely by way of example. The advantages described hereinafter also apply in the case where the micromechanical component is equipped with at least one supply line spring 20 and at least one drive spring 36.

A supply line spring constant of the at least one supply line spring 20 can be smaller than a drive spring constant of the at least one drive spring 36. This can be effected by giving the at least one supply line spring 20 a meander-shaped and/or spiral configuration. The resultant increased length of the at least one supply line spring 20 brings about a significant reduction in the supply line spring constant. That advantage is also afforded if the at least one supply line spring 20 is formed exclusively from at least one conductive material that self-supportingly spans at least one gap disposed between the drive body 12 and the mount 10. Since flexural rigidity of conductive materials is generally comparatively low, the exclusive use of at least one conductive material for the at least one supply line spring 20 enables the supply line spring constant thereof to be set to a comparatively low value. An advantageous ratio between the supply line spring constant and the drive spring constant is also ensured if the at least one supply line spring 20 is patterned out of a first layer of a first layer thickness and the at least one drive spring is patterned out of a second layer of a second layer thickness greater than the first layer thickness.

For example, the supply line spring constant can be smaller than one third, especially smaller than one fifth, preferably smaller than one eighth, of the drive spring constant. By an advantageously low setting of the supply line spring constant, it is possible to ensure that, during a deformation of the at least one supply line spring 20 owing to a movement of drive body 12 in relation to mount 10, hardly any or no mechanical stresses occur in the at least one supply line spring 20. It is thus possible to prevent damage to the at least one line component 22 guided over respective supply line spring 20 as a result of mechanical stresses, which often occur in the at least one supply line spring 20 in the case of the related art. Hence, it is also possible to use at least one easily deformable material for the at least one line component 22 without having to accept deformation/damaging of the at least one line component 22 during a movement of drive body 12 in relation to mount 10. The at least one line component 22 can be formed, for example, from copper, aluminum, silver and/or gold. It is thus possible to use for the production of the at least one line component 22 materials with a comparatively good conductivity which, in addition, can be applied to, and patterned on, a substrate in a simple manner.

By the additional attachment of drive body 12 to mount 10 with the aid of at least one drive spring 36 it is furthermore possible to obtain a sufficiently high spring stiffness of the overall spring system formed by the at least one supply line spring 20 and the at least one drive spring 36. With the aid of the at least one drive spring 36, an overall spring constant of the overall spring system can, in particular, be configured to be so stiff that the natural frequency of the oscillatory system of drive body 12 and spring system is close to a natural frequency of the rotational motion of control element 14 about rotation axis 32. The natural frequency of the oscillation mode caused with bending of the at least one drive spring 36 can, for example, be above 20 kHz. That ensures good excitability of drive body 12, which is used to drive the desired oscillating motion of control element 14 about rotation axis 32. In addition, a robustness of the micromechanical component described herein toward unwanted modes is advantageously high. The interfering modes are in this case above the useful mode and at a relatively large spacing therefrom. Consequently, production variations (from the frequency band) also are unable to result in any shifting of the modes relative to one another.

The at least one drive spring 36 can be of a configuration such that a rotation of drive body 12 about its driving axis 26, which preferably lies close to or on rotation axis 32, can be forced to occur. Drive body 12 remains at the same time inherently rigid during its driving motion, so that hardly any mechanical stress and, in particular, no mechanical stresses of at least 100 MPa, occur(s) in the at least one coil device 16. In the at least one drive spring 36 also, the mechanical stress that occurs during a movement of drive body 12 in relation to mount 10 remains under a breaking limit of about 1 GPa.

Advantageously, the at least one drive spring 36 is a flexible spring that is deformable in an S-shape, for example, the at least one drive spring 36 experiencing an S-shaped deformation in its useful mode. As will be seen by reference to FIG. 2c, an S-shaped deformation of the at least one drive spring 36 makes possible a rotational motion of drive body 12 about a driving axis 26 that is comparatively close to rotation axis 32 of control element 14. In particular, driving axis 26 may lie on rotation axis 32, which, however, for better clarity is not illustrated in FIG. 2c. Accordingly, an advantageous oscillating behavior and a good excitability of the desired displacement motion of control element 14 about rotation axis 32 are ensured.

As will additionally be seen by reference to FIG. 2a, despite its relatively long shape, at least one drive spring 36 constructed as a flexible spring that is deformable in an S-shape can be placed in a recess in mount 10, making efficient use of space. The relatively long shape of the at least one drive spring 36 ensures an advantageous freedom of movement of drive body 12 without the at least one drive spring 36 being subjected to high mechanical stresses during a movement of drive body 12 in relation to mount 10.

FIG. 2c shows an optional development of the micromechanical component, in which drive body 12 and control element 14 are disposed inside an encapsulation. The encapsulation can be formed, for example, by fastening/fixedly bonding a cover 42 to at least one attachment surface of mount 10 in such a manner that cover 42 extends over coil surface 18 and spans drive body 12 and control element 14. A magnet 46 can be fastened, outside of the encapsulation, to cover 42, which is adjacent to coil carrier surface 18 of drive body 12. Magnet 46 can, for example, be adhesively bonded to cover 42. Preferably, (cuboid) magnet 46 is spanned, at the surfaces thereof not covered by cover 42, by an arcuate or angled flux guide 44. A gap between magnet 46 and inner walls 48 of flux guide 44, which are oriented toward magnet 46 can be comparatively small. In that manner, field lines 24 of the magnetic field of magnet 46 can be oriented in such a way that a high magnetic field density is present especially at an edge region of the encapsulated interior space, which edge region is spaced from rotation axis 32 of control element 14. It is thereby possible to produce a comparatively great Lorentz force by energizing the current paths of the at least one coil device 16 that lie in the respective edge region. Owing to the advantageously great distance between those current paths and rotation axis 32, an advantageously high torque can be produced.

As is also to be seen in FIG. 2c, an S-shaped deformation of the at least one drive spring 36 causes a reduction in a spacing of drive body 12 from magnet 46. Especially in the case of a large deflection of drive body 12, it is thus possible to produce an advantageously great displacement force counteracting the at least one drive spring 36. Thus, it is also possible for relatively great deflections of drive body 12 from its home position to be performed with the development reproduced schematically in FIG. 2c.

Figure 3A:
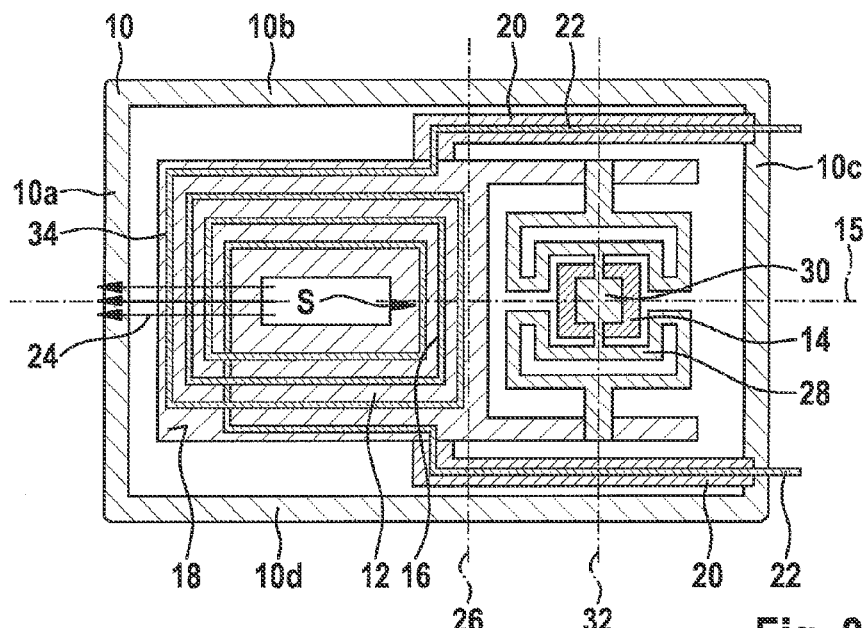
FIGS. 3a-3b show a schematic representation and a cross-section of a micromechanical component, according to a third example embodiment of the present invention.
Figure 3B:
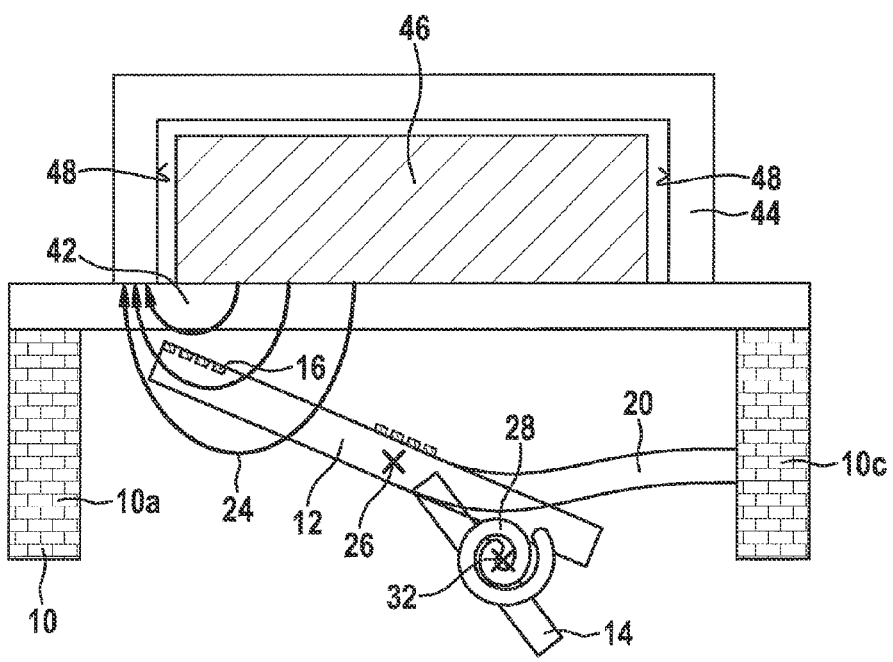

FIGS. 3a-3b show a schematic representation and a cross-section of a third example embodiment of the micromechanical component, in which springs 20 are connected to a web element 10c of mount 10, which web element 10c is adjacent to control element 14, is remote from drive body 12, and is connected by way of two web elements 10b and 10d of mount 10 to web element 10a. This can also be described as springs 20 being connected to a side of mount 10 that is close to the rotation axis 32. In this case also, an advantageously good displaceability of control element 14 is ensured, and the other advantages described above can also be produced with this embodiment.

Figure 4A:
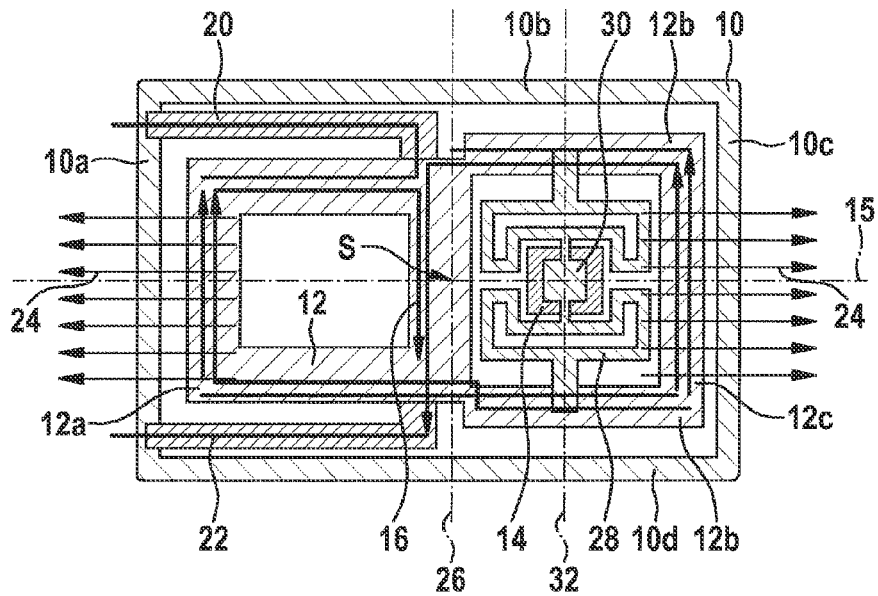
FIGS. 4a-4b show a schematic representation and a cross-section of a micromechanical component, according to a fourth example embodiment of the present invention.
Figure 4B:
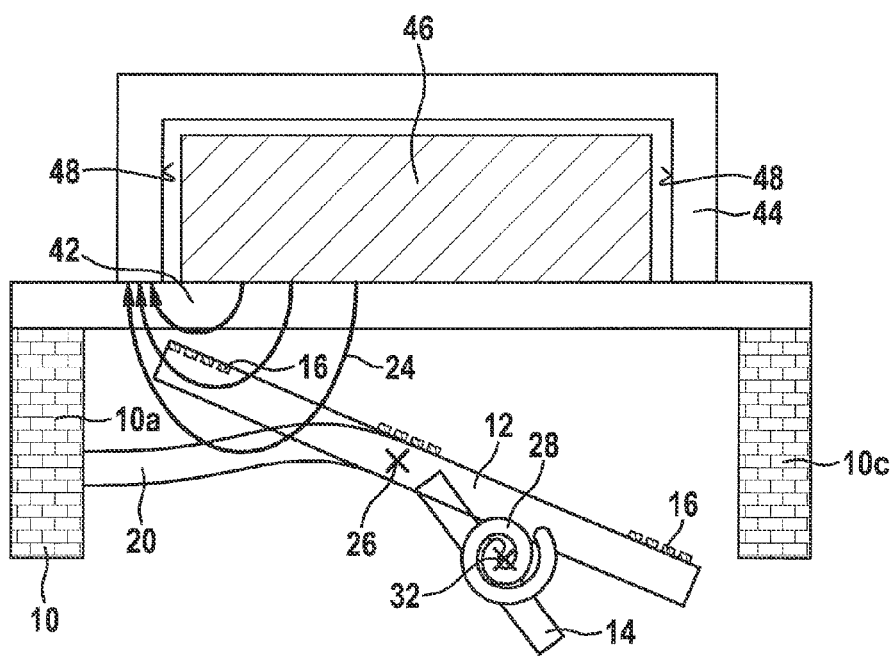

FIGS. 4a-4b show a schematic representation and a cross-section of a fourth example embodiment of the micromechanical component, in which the two web parts 12b of drive body 12 are connected by a connecting web 12c at their ends that are spaced from coil carrier 12a. In that manner, it is possible to obtain a drive body 12 that includes two coil carriers, with a coil device 16 disposed on each of the two coil carriers. Thus, the micromechanical component can also be equipped with a plurality of coil devices 16.

The above-described embodiments of the micromechanical component also illustrate the advantageous production method. A more detailed description of the production method is therefore dispensed with here.

What is claimed is:
1. A micromechanical component comprising:
a mount;

a drive body;
at least one coil device disposed on the drive body;
at least one spring connecting the drive body to the mount;
at least one line component, which is guided over the at least one spring and with which a current is conductible through the at least one coil device, wherein the drive body is settable into a driving motion by an interaction of the current conducted through the at least one coil device and a magnetic field present at the at least one coil device, the drive motion having at least one motion component about a first rotation axis, the first rotation axis being perpendicular to a direction of extension of at least a portion of the at least one spring connecting the drive body to the mount;
at least one connecting element; and
a control element connected to the drive body via the at least one connecting element, such that the control element is settable, by the driving motion of the drive body, into a deflection motion with at least one motion component about a second rotation axis that extends at a spacing from a center of gravity of the drive body.

2. The micromechanical component of claim 1, wherein the at least one connecting element disposes the drive body relative to the control element such that the drive body is oriented asymmetrically with respect to the rotation axis.

3. The micromechanical component of claim 1, wherein the control element is at least one of a mirror and a filter.

4. The micromechanical component of claim 1, wherein the second rotation axis extends centrally through the control element.

5. The micromechanical component of claim 1, wherein the at least one line component is formed of at least one of copper, aluminum, silver and gold.

6. The micromechanical component of claim 1, wherein the at least one connecting element includes a web element that is oriented perpendicularly to a coil carrier surface of the drive body.

7. The micromechanical component of claim 1, further comprising:
a cover adjacent to a coil carrier surface of the drive body;
an encapsulation in which the drive body and the control element are arranged; and
a magnet fastened outside of the encapsulation and to the cover.

8. A micromechanical component comprising:
a mount;
a drive body;
at least one coil device disposed on the drive body;
at least one spring connecting the drive body to the mount;
at least one line component, which is guided over the at least one spring and with which a current is conductible through the at least one coil device, wherein the drive body is settable set into a driving motion by an interaction of the current conducted through the at least one coil device and a magnetic field present at the at least one coil device;
at least one connecting element; and
a control element connected to the drive body via the at least one connecting element, such that the control element is settable, by the driving motion of the drive body, into a deflection motion with at least one motion component about a rotation axis that extends at a spacing from a center of gravity of the drive body,
wherein the at least one spring is a flexible spring that is deformable into an S-shape.

9. A micromechanical component comprising:
a mount;
a drive body;
at least one coil device disposed on the drive body;
at least one spring connecting the drive body to the mount;
at least one line component, which is guided over the at least one spring and with which a current is conductible through the at least one coil device, wherein the drive body is settable set into a driving motion by an interaction of the current conducted through the at least one coil device and a magnetic field present at the at least one coil device;
at least one connecting element; and
a control element connected to the drive body via the at least one connecting element, such that the control element is settable, by the driving motion of the drive body, into a deflection motion with at least one motion component about a rotation axis that extends at a spacing from a center of gravity of the drive body,
wherein the at least one spring includes at least one supply line spring carrying the at least one line component, and at least one drive spring not carrying any line component.

10. The micromechanical component of claim 9, wherein a supply line spring constant of the at least one supply line spring is smaller than a drive spring constant of the at least one drive spring.

11. The micromechanical component as recited in claim 10, wherein the supply line spring constant is less than one third of the drive spring constant.

12. The micromechanical component of claim 9, wherein the at least one supply line spring is patterned out of a first layer, the at least one drive spring is patterned out of a second layer, and a thickness of the first layer is less than a thickness of the second layer.

13. The micromechanical component of claim 9, wherein the at least one supply line spring is at least one of meander-shaped and of a spiral configuration.

14. The micromechanical component of claim 9, wherein the at least one supply line spring is formed exclusively from at least one conductive material that self-supportingly spans at least one gap between the drive body and the mount.

15. A method for producing a micromechanical component, the method comprising:
connecting a drive body, on which at least one coil device is disposed, to a mount by way of at least one spring, wherein, upon operation of the micromechanical component, a current is conductible through the at least one coil device by at least one line component that is guided over the at least one spring, with an interaction of the current conducted through the at least one coil device and a magnetic field, which is present at the at least one coil device, setting the drive body into a driving motion, wherein the at least one spring is a flexible spring that is deformable into an S-shape; and
connecting a control element to the drive body via at least one connecting element in a manner that causes the control element to be set, by the driving motion of the drive body, into a deflection motion with at least one motion component directed about a rotation axis that extends at a spacing from a center of gravity of the drive body.

* * * * *